United States Patent [19]

Miyakawa et al.

[11] Patent Number: 5,028,994
[45] Date of Patent: Jul. 2, 1991

[54] SYNCHRONIZED THREE DIMENSIONAL IMAGING APPARATUS

[75] Inventors: Yasumi Miyakawa; Yoshinori Kitamura; Shoji Nishikawa, all of Osaka; Atsushi Morimura, Nara; Hideo Toyoda, Osaka, all of Japan

[73] Assignee: Matsushita Electric Industrial Co., Ltd., Osaka, Japan

[21] Appl. No.: 430,444

[22] PCT Filed: Jan. 31, 1989

[86] PCT No.: PCT/JP89/00099
§ 371 Date: Nov. 20, 1989
§ 102(e) Date: Nov. 20, 1989

[87] PCT Pub. No.: WO89/07379
PCT Pub. Date: Aug. 10, 1989

[30] Foreign Application Priority Data

Feb. 1, 1988 [JP] Japan .................. 63-21550

[51] Int. Cl.⁵ ............................................. H04N 13/00
[52] U.S. Cl. .................................. 358/92; 358/213.25; 358/91
[58] Field of Search ............... 358/88, 91, 92, 213.25, 358/213.26, 148

[56] References Cited

U.S. PATENT DOCUMENTS 4,575,722 3/1986 Anderson .................. 358/92 X

FOREIGN PATENT DOCUMENTS

57-25783 2/1982 Japan .
57-75089 5/1982 Japan .
62-19883 7/1987 Japan .
62-208789 9/1987 Japan .

Primary Examiner—Victor R. Kostak
Attorney, Agent, or Firm—Panitch Schwarze Jacobs & Nadel

[57] ABSTRACT

The present invention uses a single television camera (40), an optical system, and a plurality of optical paths comprising a plurality of mirrors (22), (23), and (26), and shutters (24) and (27) for blocking light. Object images from the optical paths are alternately selected in synchronization with the field scanning operation of the television camera (40) to be projected into the television camera (40) so that a final image is picked up in three dimensions. The imaging device (FIG. 2) used in the television camera (40) has two-dimensionally arranged photoelectric converting elements (42) and corresponding vertical transfer stages (43), and is designed so that signal charges accumulated in the two-dimensionally arranged photoelectric converting elements (42) are transferred simultaneously to the corresponding vertical transfer stages (43). The timing of selecting the object images for projection into the television camera (40) is approximately in synchronization with the timing of transferring the signal charges from the photoelectric converting elements (42) to the corresponding vertical transfer stages (43).

6 Claims, 8 Drawing Sheets

SYNCHRONIZED THREE DIMENSIONAL IMAGING APPARATUS

TECHNICAL FIELD

The present invention relates to a three-dimensional image pickup apparatus for picking up an object image in three dimensions.

BACKGROUND ART

Figure 5:
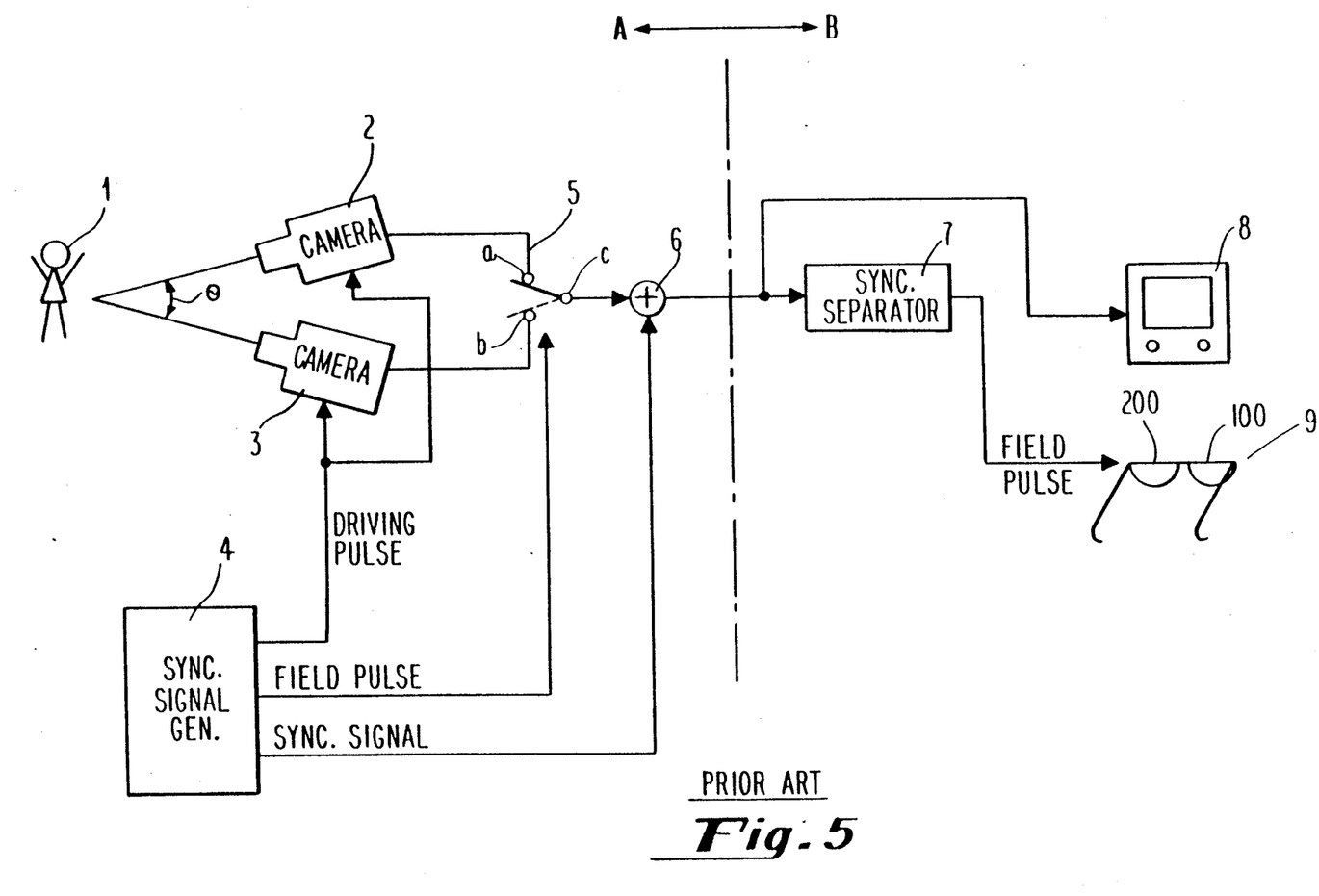
FIG. 5 is a block diagram of a prior art three-dimensional image pickup apparatus.

As a basic method for picking up an object image in three dimensional, it has been known to shoot an object using two television cameras each disposed at a given angle to the object, the output signals from these two television cameras being alternately selected for every field. FIG. 5 illustrates diagrammatically the configuration of such a three-dimensional image pickup apparatus. In FIG. 5, shown on side A of the dashed line is a three-dimensional image pickup apparatus, while a three-dimensional display apparatus is shown on a side B. In this figure, the numeral 1 indicates an object, the numeral 2 a television camera A, and the numeral 3 a television camera B, each of the television cameras A and B having a lens disposed forwardly of an imaging screen provided therein. These are combined with a synchronizing signal generator 4, a switch 5, and an adder 6 to compose the three-dimensional image pickup apparatus. The three-dimensional display apparatus comprises a sync separator 7, a monitor television 8, and a pair of glasses 9.

Since the three-dimensional image pickup apparatus and three-dimensional display apparatus having the above configuration are well known in the art, only a brief description is given herein, and the three-dimensional image pickup apparatus will be described. The television cameras 2 and 3 are disposed forming a given angle $\theta$ between them with respect to the object 1. The scanning timings of the television cameras 2 and 3 are in synchronizing relationship with each other. For this purpose, the synchronizing signal generator 4 supplies pulse signals necessary for driving the television cameras, simultaneously to the television camera 2 and the television camera 3 (the television camera 2 corresponds to the human right eye, and the television camera 3 to the human left eye). The video signals from the television cameras 2 and 3 are respectively supplied to terminals a and b of the switch 5. The switch 5 is controlled by field pulses supplied from the synchronizing signal generator 4, alternately switching the output signals at the terminal c of switch 5 from field to field in such a way that the video signal fed from the television camera 1 is output in the first field and that the video signal fed from the television camera 2 is output in the second field. Both the video signal thus obtained by switching and the synchronizing signals supplied from the synchronizing signal generator 4 are supplied to the adder 6 which combines these signals to produce a three-dimensional image video signal. Needless to say, the television camera driving pulses, field pulses, and synchronizing signals supplied from the synchronizing signal generator 4 are all in synchronizing relationship with one another.

Next, the three-dimensional display apparatus will be described. The three-dimensional image video signal produced by the three-dimensional image pickup apparatus having the above-mentioned structure is transmitted via an appropriate means to the three-dimensional display apparatus. The transmitted three-dimensional image video signal is fed into the monitor television 8 for displaying the image. Since the three-dimensional image video signal is produced by alternately selecting the video signals from the television cameras 2 and 3, the image displayed on the monitor television 8 when directly viewed appears double and unnatural, and does not give a three-dimensional effect to the human eye.

In order to view the image displayed on the monitor television 8 in three dimensions, it is necessary for the observer to view the image shot by the television camera 2 only with his right eye, and the image shot by the television camera 3 only with his left eye. That is, the image displayed on the monitor television 8 must be selected so that the image pattern of the first field enters the right eye and the image pattern of the second field enters the left eye. To achieve this object, the light signals from the monitor television 8 are selected by means of the glasses 9 having optical shutters so that the image pattern of the first field is viewed with the right eye and the image pattern of the second field with the left eye. The sync separator 7 outputs field pules synchronous with the synchronizing signals. Here it is supposed that the field pulse signals output from the sync separator 7 are at a high level for the first field and at a low level for the second field. The field pulses are supplied to the glasses 9 to alternately operate the optical shutters provided therein, thus selecting the light signals from the monitor television 8 between the right and left eyes. To describe specifically, during the first field, the optical shutter for the right eye of the glasses 9 transmits the light while the optical shutter for the left eye blocks the light. Conversely, during the second field, the optical shutter for the left eye of the glasses 9 transmits the light while the optical shutter for the right eye blocks the light. The light signals from the monitor television 8 are thus selected, making it possible to view the image in three dimensions.

The outline of the optical shutters will be described. A mechanical shutter may be used as the optical shutter, but here we will describe an optical shutter using a liquid crystal. A liquid crystal shutter is capable of transmitting and blocking light by controlling the voltage applied to the liquid crystal, and has a sufficiently fast response to the field scanning frequency of the television camera. It also has other advantages of longer life, easier handling, etc., as compared with the mechanical shutter.

Figure 6:
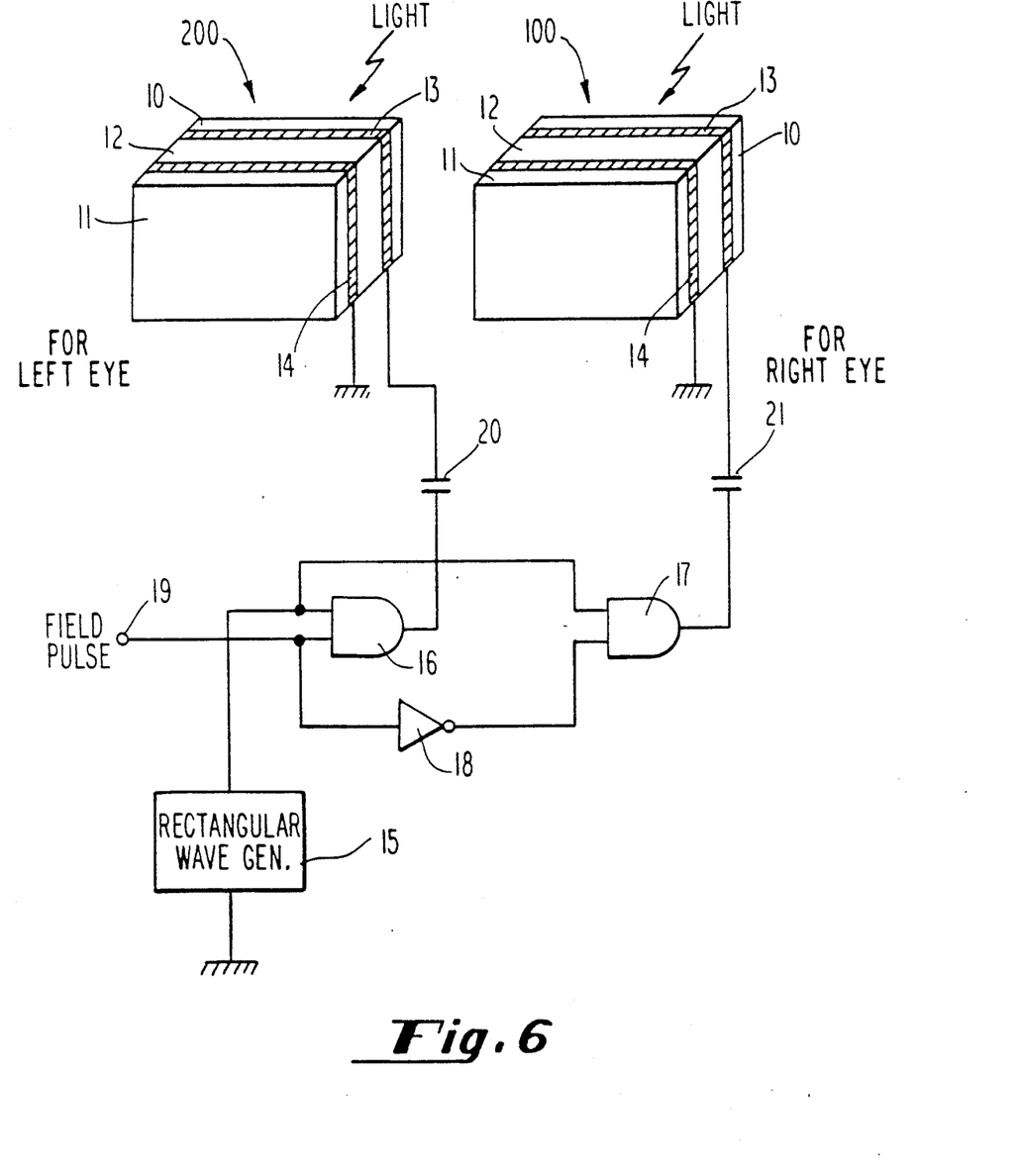
FIG. 6 is a block diagram showing the construction of an optical shutter.

Referring to FIG. 6, the liquid crystal shutter will be briefly described. FIG. 6 is a schematic diagram of an object image. The numerals 10 and 11 indicate deflector plates, the numeral 12 a liquid crystal, the numerals 13 and 14 transparent electrodes, the numeral 15 is a rectangular wave generator, the numerals 16 and 17 are AND circuits, the numerals 20 and 21 capacitors, the numeral 18 an inverter, and the numeral 19 a field pulse input terminal. The optical shutter is basically constructed so that the liquid crystal (twisted nematic type) 12 is interposed between the two kinds of deflector plates 10 and 11, and that an electric field is applied to the liquid crystal which transmits or blocks light to serve as an optical shutter. Since the twisted nematic type liquid crystal is well known in the art, its description is omitted.

The deflector plates, the liquid crystal, and the transparent electrodes constitute the optical section of each of optical shutters 100 and 200. The deflector plate 10 transmits only the horizontal polarization wave of the light transmitted from the object, while the deflector plate 11 works to transmit only the vertical polarization wave. The transparent electrode 14 is grounded. The transparent electrode 13 is used to apply an electric field to the liquid crystal 12. In the above construction, when a voltage is not applied to the transparent electrode 13, the horizontal polarization wave transmitted through the deflector plate 10 is phase-shifted to a vertical polarization wave when it passes through the layer of the liquid crystal 12, and the vertical polarization wave passed through the layer of the liquid crystal 12 is transmitted through the deflector plate 11. This means that the liquid crystal shutter is in a permeable state, allowing the light from the monitor television to reach the human eye. On the other hand, when a voltage is applied to the transparent electrode 13, the horizontal polarization wave transmitted through the deflector plate 10 is not phase-shifted, but passes through the layer of the liquid crystal 12, retaining the state of the horizontal polarization. Therefore, the horizontal polarization wave passed through the layer of the liquid crystal 12 cannot permeate the deflector plate 11. This means that the liquid crystal shutter is in a non-permeable state, preventing the light from the monitor television from reaching the human eye. The transparent electrode 14 is grounded, as previously noted, and a driving signal is supplied to the transparent electrode 13 via the capacitors 20 and 21. The driving voltage applied to the transparent electrode 13 is approximately 10 V, and the driving frequency is approximately 200 Hz. The driving signal is produced using the rectangular wave generator 15, the AND circuits 16 and 17, the inverter 18, and the field pulse input terminal 19. To describe in detail, the rectangular wave generator 15 is caused to generate a rectangular wave of approximately 200 Hz, and the output signal from the rectangular wave generator 15 is supplied to the AND circuits 16 and 17 simultaneously. To the AND circuit 16, the field pulse which is at a high level for the first field and at a low level for the second field is supplied via the field pulse input terminal 19. Therefore, the driving signal for the liquid crystal layer is derived from the AND circuit 16 only when the first field is being reproduced. On the other hand, the field pulse supplied via the field pulse input terminal 19 is inverted by the inverter 18, and then supplied the AND circuit 17. Thus, the driving signal for the liquid crystal layer is derived from the AND circuit 17 only when the second field is being reproduced. The crystal shutter is constructed in this way. Namely, the light is allowed to pass through the right side shutter 100 of the glasses 9 shown in FIG. 6 during the reproduction of the first field, and through the left side shutter 200 of the glasses 9 during the reproduction of the second field.

However, the three-dimensional image pickup apparatus having the above-described structure requires two television cameras, thus making it expensive to construct the system. Also, since two television cameras are used to shoot the same object, preciseness is required in adjusting the shooting angles, the focusing, the angle between the two television cameras to the object, and other settings. Therefore, the above construction requires a lot of time for adjustment as compared with the time needed for shooting the object, and thus lacks mobility.

DISCLOSURE OF THE INVENTION

In view of the above difficulties with the prior art, it is an object of the present invention to provide a three-dimensional image pickup apparatus which is inexpensive in construction and easy in adjustment. To achieve the above object, the three-dimensional image pickup apparatus of the present invention employs a television camera equipped with an imaging device which has at least photoelectric converting elements and vertical transfer stages and which is so designed as to read out signal charges stored in the photoelectric converting elements one or more times for every field by transferring them almost simultaneously to the corresponding vertical transfer states, and alternately selects object images projected through two different optical paths for every field for picking up an image, the selection timing being approximately in synchronization with the transfer timing of the signal charges from the photoelectric converting elements to the vertical transfer stages.

In the above construction, object images projected through the two optical paths are alternately selected in synchronization with the field scanning of the imaging device, thereby permitting the use of a single television camera for picking up an image in three dimensions. The imaging device employed in the television camera has at least photoelectric converting elements and vertical transfer stages. In the case where the photoelectric converting elements contains the vertical transfer stages, the imaging device has a storage site for the signal charges on the extension of each vertical transfer stages in the transferring direction, and since the signal charges stored in the photoelectric converting elements are transferred almost simultaneously to the corresponding vertical transfer stages for simultaneous pickup of the whole screen of the image, the imaging device capable of surface scanning is used. The storage time of the signal charges in each photoelectric converting element of the imaging device is equal to, or shorter than the time needed for scanning one field. The object images projected through the two optical paths onto the imaging device are alternately selected using optical shutters, approximately in synchronization with the timing of transferring the signal charges from the photoelectric converting elements to the vertical transfer stages of the imaging device. By using the above-mentioned imaging device, by setting the signal charge storage time in each photoelectric converting element of the imaging device to be less than the time needed for scanning one field, and by approximately synchronizing the selection timing of the optical paths with the timing of transferring the signal charges from the photoelectric converting elements to the vertical transfer stages of the imaging device, it is possible to pick up an image of good quality in three dimensions using a single television camera.

BEST MODE FOR CARRYING OUT THE INVENTION

The following describes a three-dimensional image pickup apparatus of a first embodiment of the present invention, with reference to the accompanying drawings.

Figure 1:
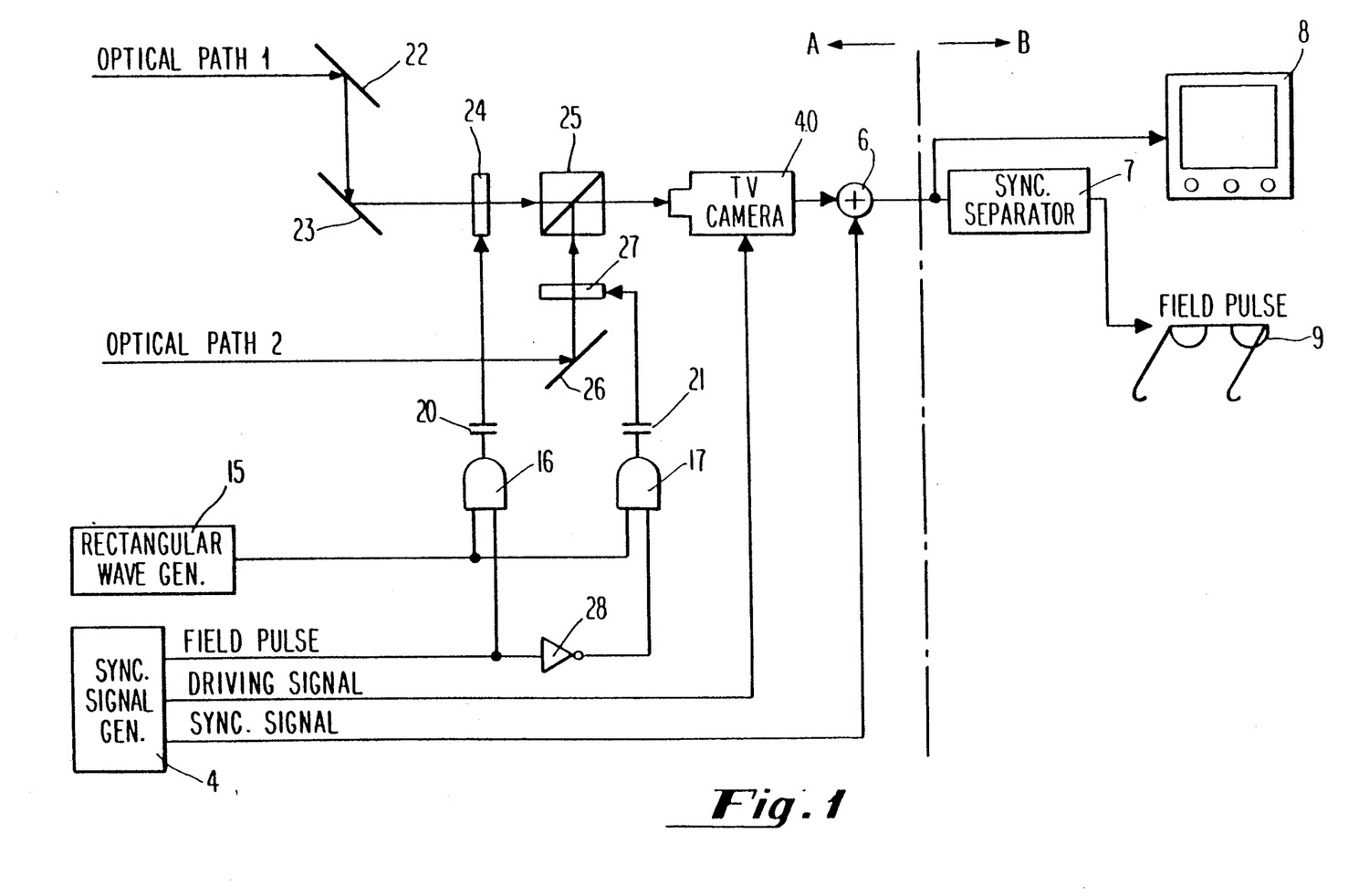
FIG. 1 is a block diagram showing schematically the construction of a three-dimensional image pickup apparatus in one embodiment of the present invention.

In FIG. 1, shown on side A of the dashed line is a three-dimensional image pickup apparatus, while a three-dimensional display apparatus is shown on side B. The numeral 40 indicates a television camera, the numeral 4 a synchronizing signal generator, the numeral 6 an adder, the numerals 22, 23 and 26 mirrors, the numerals 24 and 27 liquid crystal shutters, the numeral 25 a semitransparent mirror, the numeral 28 an inverter, the numerals 16 and 17 AND circuits, the numeral 15 a rectangular wave generator, the numerals 20 and 21 capacitors, and the numeral 100 a liquid crystal shutter driving circuit. The mirrors 22 and 23, the liquid crystal shutter 24, and the semitransaprent mirror 25 constitute a first optical path while the mirror 26, the liquid crystal shutter 27, and the semitransparent mirror 25 constitute a second optical path. The synchronizing signal generator 4, the adder 6, the mirrors 22, 23 and 26, the liquid crystal shutters 24 and 27, the semitransparent mirror 25 and the television camera 40 constitute the three-dimensional image pickup apparatus.

The operation of the three-diemnsional apparatus is now described. To the television camera 40, pulse signals necessary for driving the television camera are supplied from the synchronizing signal generator 4. The television camera driving pulses, field pulses, and synchronizing pulses supplied from the synchronizing signal generator 4 are all in synchronizing relationship with one another. The light from an object introduced through the mirrors 22 and 23 and the liquid crystal shutter 24 is passed through the semitransparent mirror 25, and then focused onto the photoelectric converting area of an imaging device provided in the television camera 40. The light from the object introduced through the mirror 26 and the liquid crystal shutter 27 is deflected by 90 degrees by the semitransparent mirror 25, and then focused onto the photoelectric converting area of the imaging device provided in the television camera 40. The optical paths 1 and 2 are disposed with their respective optical axes forming a given angle θ (not shown) with respect to the same object. (The optical paths 1 and 2 correspond to the human right and left eyes, respectively).

The optical shutters useful in the present invention are which liquid crystal shutters which capable of transmitting and obstructing light by controlling the voltage, which respond sufficiently fast with respect to the field scanning frequency of the television camera, and which have a long life. The optical shutters using liquid crystals may be of approximately the same construction as those previously described with reference to FIG. 6. Since they operate in the same principle, their construction and operation are only briefly described herein.

Each of the liquid crystal shutters 24 and 27 comprise the deflector plates 10 and 11, the liquid crystal 12, and the transparent electrodes 13 and 14 shown in FIG. 6.

The liquid crystal shutters 24 and 27 are controlled by the driving pulses supplied from the liquid crystal shutter driving circuit. As previously described with reference to FIGS. 4 and 6, description is given here supposing that the liquid crystal shutters become light permeable when the field pulse supplied to the AND circuits 16 and 17 that form part of the liquid crystal shutter driving circuit is at a low level. It is also supposed that the field pulse is at a high level for the first field and at a low level for the second field. Therefore, the liquid crystal shutter 27 shown in FIG. 1 transmits light in the first field, while the liquid crystal shutter 24 transmits light in the second field. This means that in the first field the light signals of the object image introduced through the second optical path is projected onto the imaging device, while in the second field the light signals of the object image introduced through the first optical path is projected onto the imaging device.

The imaging device receives the light signals of the object image on its photoelectric converting area, basically, over the period of one field or one frame, and integrates (stores) the photoelectrically converted signal charges over the period of one field or one frame, after which the thus stored signal charges are read out. Therefore, the output signal is provided with delay time equivalent to the period of one field against the light signals projected on the imaging screen.

Figure 4A:
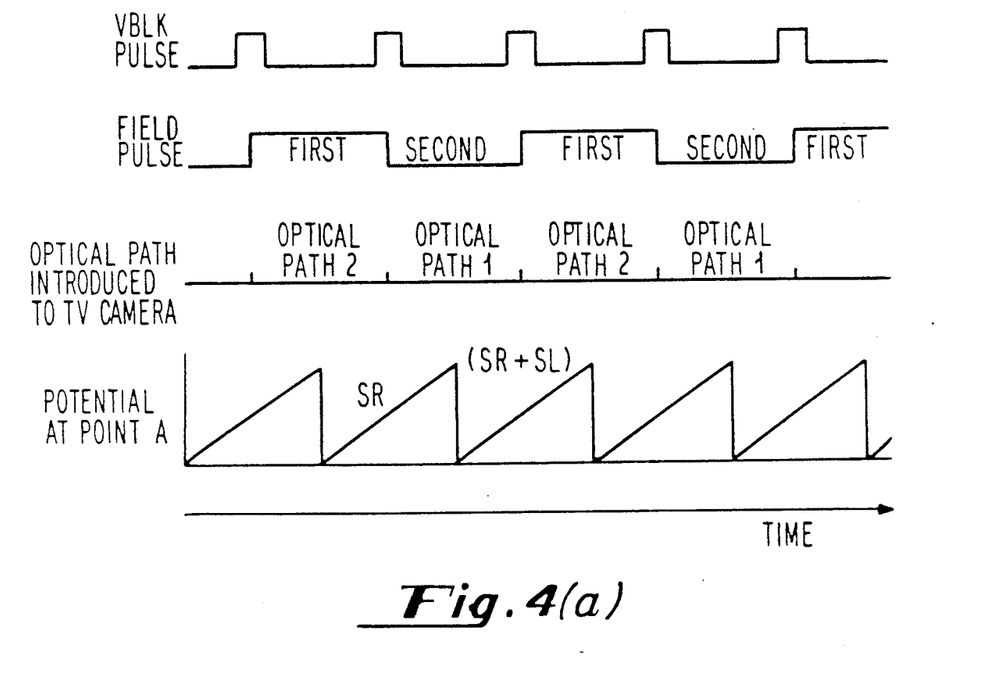
FIGS. 4a and 4b are a timing chart showing the operating timing when an image pickup tube is used for the three-dimensional image pickup apparatus.
Figure 4B:
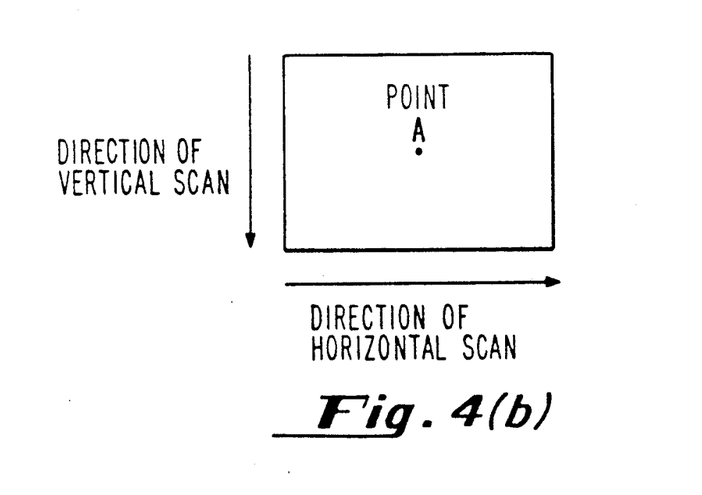

If a line-sequential scanning image device such as an image pickup tube or an X-Y matrix imaging device (MOS imaging device) is used for the television camera 40, three-dimensional image signals cannot be obtained. The reason will be explained with reference to FIG. 4. FIG. 4a shows diagrammatically the conditions of the television camera scanning field and the liquid crystal shutters and the potential at a point A on the imaging screen (photoelectric converting area) of the above line-sequential scanning imaging device, while FIG. 4b shows the imaging screen of the line-sequential scanning imaging device. The light signals of the optical image to be projected onto the imaging device are introduced through the second optical path (liquid crystal shutter 27) in the first field, and through the first optical path (liquid crystal shutter 24) in the second field. For convenience of explanation, the light signals introduced through the first optical path are hereinafter denoted by R, and the light signals introduced through the second optical by L. Description will be given by taking the above mentioned image pickup tube which is a line-sequential scanning imaging device, as an example of the imaging device. The potential at the point A on the imaging screen of the image pickup tube gradually changes with time as the stored signal charge increases. The signal charges at the point A are then read out when a given scanning timing comes. At this point of time, however, as is apparent from FIG. 4a, the signal charge component SR generated by the light introduced through the first optical path and the signal charge component SL generated by the light introduced through the second optical path are mixed in the signal charge generating at the point A. This virtually means that the light from the two optical paths are mixed for projection onto the imaging device, and therefore, the television camera 40 is only able to produce blurred image signals, thus being unable to produce three-dimensional image signals. Therefore, for the television camera 40, this embodiment of the invention uses an imaging device which has at least photoelectric converting elements and vertical transfer stages, or in the case where photoelectric converting elements and vertical transfer stages are combined, an imaging device which has a storage site provided on the extension of each vertical transfer stage in its transferring direction. Also, the storage time of the signal charge in the photoelectric converting elements of the imaging device is set at less than the time needed for scanning one field. The optical images introduced through the two optical paths into the imaging device are alternately selected for every field using optical shutters approximately in synchronization with the timing of transferring the signal charges from the photoelectric converting elements to the vertical transfer stages of the imaging device of the above construction.

Figure 2A:
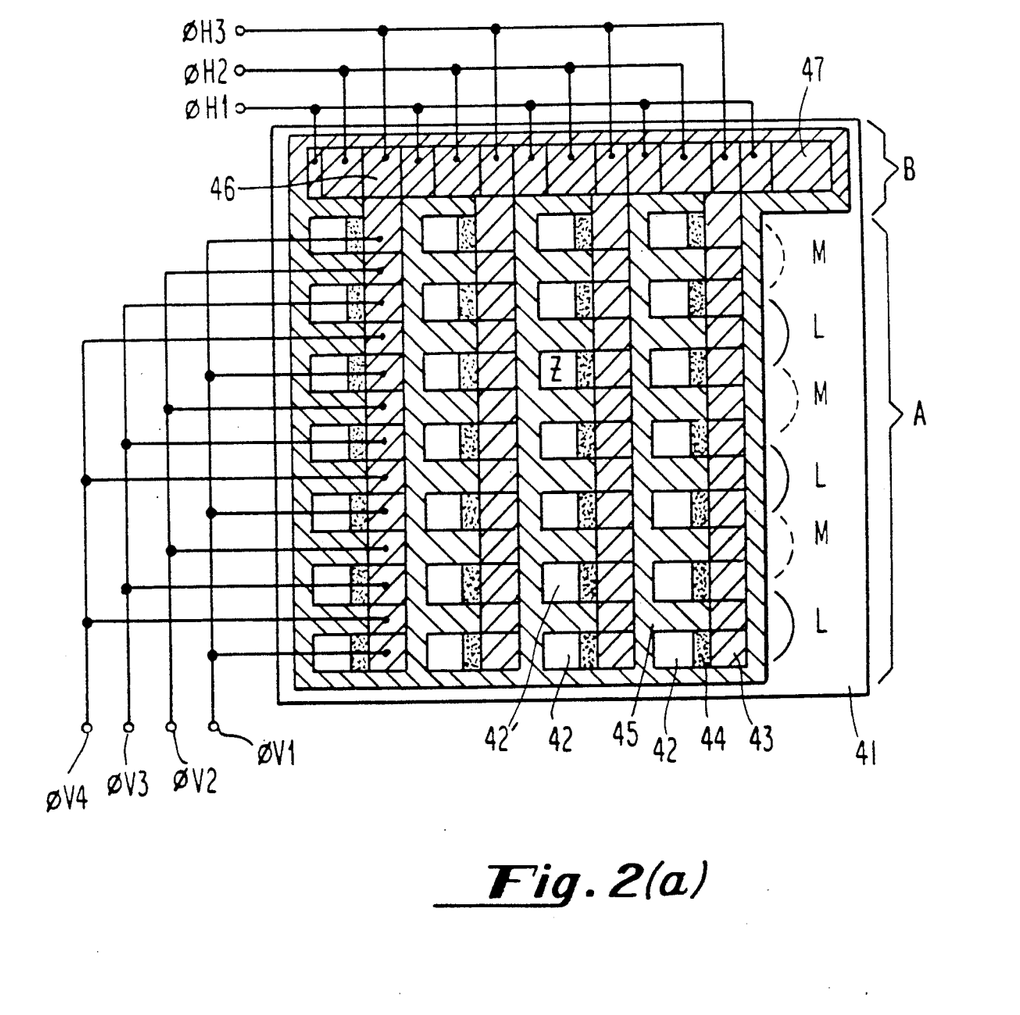
FIG. 2a is a schematic diagram showing the construction of an imaging device used in the three-dimensional image pickup apparatus.

Imaging devices useful in the present invention include an interline transfer charge-coupled device (hereinafter abbreviated as IL-CCD), a frame transfer charge-coupled device (hereinafter abbreviated as FT-CCD), and a frame/interline transfer charge-coupled device (hereinafter abbreviated as FIT-CCD). In the description of this embodiment, we will deal with the case where an IL-CCD is used as the imaging device. FIG. 2a is a schematic diagram showing the construction of an interline transfer charge-coupled device (IL-CCD) used in the three-dimensional image pickup apparatus according to this embodiment of the invention. Since the IL-CCD is well known, its construction and operation are only briefly described herein. As shown in FIG. 2a, the IL-CCD is composed of a light receiving section A and a horizontal transfer section B. The numeral 41 indicates a semiconductor substrate. The light receiving section A comprises two-dimensionally arranged photoelectric converting elements (light receiving elements) 42, gates 44 for reading out signal charges accumulated in the photoelectric converting elements, and vertical transfer stages 43 formed by CCDs to vertically transfer the signal charges read out by the gates. All the areas except the photoelectric converting elements 42 are shielded from light by an aluminum mask (not shown). The photoelectric converting elements are separated from one another in both vertical and horizontal directions by means of a channel stopper 45. Adjacent to each photoelectric converting element are disposed an overflow drain (not shown) and an overflow control gate (not shown). The vertical transfer stages 43 comprise polysilicon electrodes $\phi V1$, $\phi V2$, $\phi V3$, and $\phi V4$, which are disposed continuously in the horizontal direction and linked in the vertical direction at the intervals of four horizontal lines. The horizontal transfer section B comprises horizontal transfer stages 46 formed by CCDs, and a signal charge detection site 47. The horizontal transfer stages 46 comprise transfer electrodes $\phi H1$, $\phi H2$, and $\phi H3$, which are linked in the horizontal direction at the intervals of three electrodes. The signal charges transferred by the vertical transfer stages are transferred toward the electric charge detection site 47, by means of the horizontal transfer stages 46. The electric charge detection site 47, which is formed by a well known floating diffusion amplifier, converts a signal charge to a signal voltage.

The operation will now be described briefly. The signal charges photoelectrically converted and accumulated in the photoelectric converting elements 42 and 42 are transferred from the photoelectric converting sections 42 and 42 to the vertical transfer stages 43 during the vertical blanking period, using the signal readout pulse $\phi CH$ superposed on $\phi V1$ and $\phi V3$ of the vertical transfer pulses $\phi V1$–$\phi V4$ applied to the vertical transfer stages. When the signal readout pulse $\phi CH$ is applied to $\phi V1$, only the signal charges accumulated in the photoelectric converting elements 42 are transferred to the potential well under the electrode $\phi V1$, and when the signal readout pulse $\phi CH$ is applied to $\phi V3$, only the signal charges accumulated in the photoelectric converting section 42 are transferred to the potential well under the electrode $\phi V3$.

Thus, the signal charges accumulated in the two-dimensionally arranged numerous photoelectric converting elements 42 and 42 are transferred to the vertical transfer stages 43, simultaneously when the signal readout pulse $\phi CH$ is applied. Therefore, by superposing the signal readout pulse $\phi CH$ alternately on $\phi V1$ and $\phi V3$ in alternate fields, signals are read out from each photoelectric converting section once for every frame, and thus the IL-CCD operates to accumulate frame information.

The signal charges transferred from the photoelectric converting elements 42 to the electrodes $\phi V1$ or $\phi V3$ of the vertical transfer stages 43 are transferred to the corresponding horizontal transfer electrode of the horizontal transfer stages 46 line by line in every horizontal scanning cycle, using the vertical transfer pulses $\phi V1$, $\phi V2$, $\phi V3$, and $\phi V4$. Also, if the signal readout pulse $\phi CH$ is applied almost simultaneously to both $\phi V1$ and $\phi V3$ in one field period, the signal charges accumulated in the photoelectric converting element 42 are transferred to the potential well under the electrode $\phi V1$, and the signal charges accumulated in the photoelectric converting element 42 to the potential well under the electrode $\phi V3$. Signals are read out from each photoelectric converting element once for every field, and thus the IL-CCD operates to accumulate field information. In this case, the signal charges from the vertically adjacent photoelectric converting elements, i.e. L for the first field and M for the second field, are mixed in the vertical transfer stages, thereafter the signal charges which had been transferred from the photoelectric converting elements 42 to the electrodes $\phi V1$ and $\phi V3$ of the vertical transfer stages 43 are transferred to the corresponding horizontal transfer electrodes of the horizontal transfer stages 46 line by line in every horizontal scanning cycle, using the vertical transfer pulses $\phi V1$, $\phi V2$, $\phi V3$, and $\phi V4$. The signal charges transferred to the horizontal transfer electrodes are transferred to the horizontally disposed signal charge detection site 47, using high-speed horizontal transfer pulses $\phi H1$, $\phi H2$, and $\phi H3$, where the signal charges are converted to a voltage signal to form the video signal to be outputted from the imaging device.

Figure 2B:
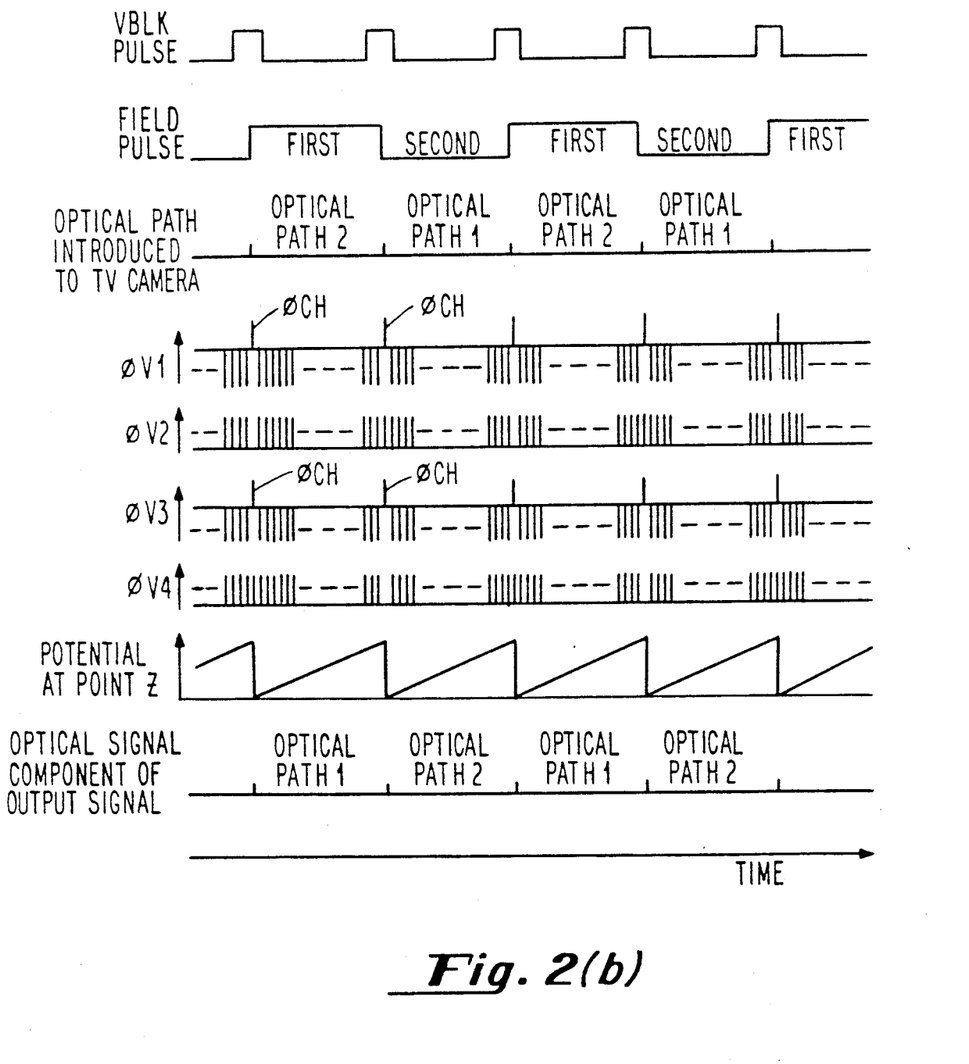
FIG. 2b is a timing chart showing an operating timing and a liquid crystal shutter switching timing.

The signal readout timing of the above IL-CCD in the three-dimensional image pickup apparatus of the present invention, the driving timing of the liquid crystal shutter, and the potential change in the photoelectric converting element at point Z shown in FIG. 2a are now shown in FIG. 2b. FIG. 2b shows the pulse (VBLK) representing the vertical blanking period, the field pulse emitted from the synchronizing signal generator 4 of FIG. 1, the signal readout timing of the IL-CCD, the driving timing of the liquid crystal shutter, the potential change in the photoelectric converting element at point Z, and the output signal from the imaging device. The signal readout (transfer of signal charges) from the photoelectric converting elements to the vertical transfer stages is performed during the vertical blanking period, while the switching of the liquid crystal shutters is approximately coincident with the signal readout timing from the photoelectric converting elements to the vertical transfer stages. The switching timing of the field pulses is also approximately coincident with the signal readout timing from the photoelectric converting elements to the vertical transfer stages. When the imaging device and the liquid crystal shutters are driven with the above timing, the light signals of the optical image are introduced through the second optical path in the first field to be projected onto the imaging device, and, in contrast, the light signals of the optical image are introduced through the first optical path in the second field to be projected onto the imaging device. In this case, the potential at point Z on the imaging screen of the image pickup element gradually changes with time, as shown in FIG. 2b. The signal charge at point Z is transferred to the vertical transfer stage at the specified timing (application of the pulse for reading out the signal from the photoelectric converting element to the vertical transfer stage). As is apparent from FIG. 2b, obtained at this time from the point Z is either the signal charge generated from the light introduced through the first optical path or the signal charge generated from the light introduced through the second optical path, thus preventing the light from two different optical paths from being mixed with each other for projection onto the photoelectric converting elements in the imaging device. By using the above construction and by picking up an object image with the above driving timing, the television camera 40 shown in FIG. 1 is capable of alternately outputting the video signal of the object image transmitted through the first optical path for the first field, and the video signal of the object image transmitted through the second optical path for the second field, thus producing a three-dimensional image video signal. In this embodiment, the signal charges at all photoelectric converting elements are first transferred (read out) to the vertical transfer stages, and then the signal charges from the adjacent photoelectric converting elements are mixed with each other in the vertical transfer stages for further transfer, thus obtaining the video information of field accumulation from the imaging device.

Figure 3A:
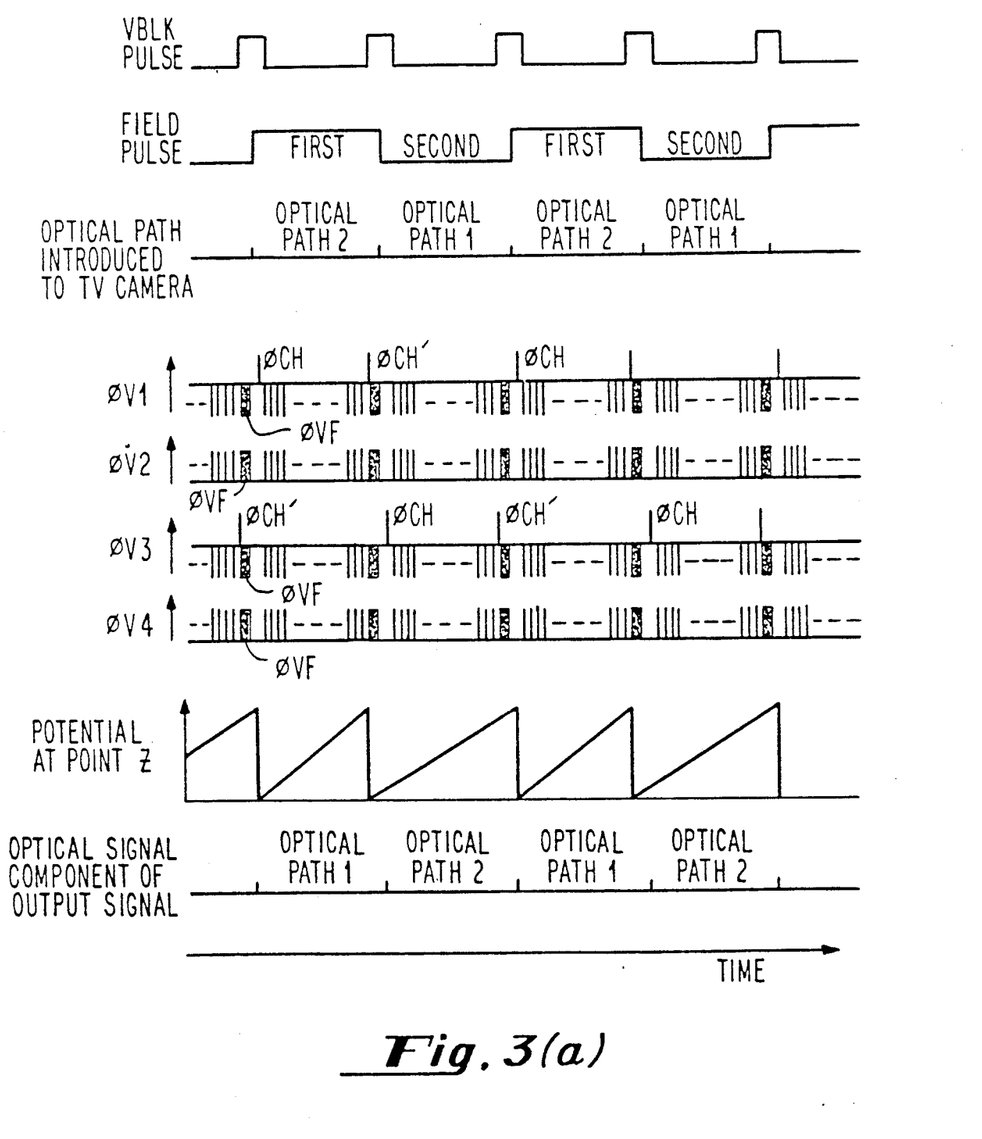
FIGS. 3a and 3b are timing charts showing the operating timing of the imaging device and the switching timing of the liquid crystal shutters, respectively.

A second embodiment of the present invention will be described with reference to FIG. 3. In an IL-CCD, it is possible to obtain video information of field accumulation without mixing the signal charges from two adjacent photoelectric converting elements as is done in the case of the foregoing embodiment. The principle is described referring to FIGS. 2a and 3b. FIG. 3a shows the pulse (VBLK) representing the vertical blanking period, the field pulse emitted from the synchronizing signal generator 4 shown in FIG. 1, the signal readout timing of the IL-CCD, the driving timing of the liquid crystal shutters, the potential change in the photoelectric converting element at point Z, and the output signal from the imaging device.

The following describes the operation. During the first field, the signal readout pulse $\phi$CH is applied to $\phi$V3 to transfer the signal charges generated at the photoelectric converting element 42 to the vertical transfer stage. The signal charges are then transferred at high speed, using a high-speed transfer pulse $\phi$VF attached to the vertical transfer pulses $\phi$V1-$\phi$V4, and are emitted from the horizontal transfer stage. Thereafter, the signal readout pulse $\phi$CH is applied to $\phi$V1 to transfer the signal charges generated at the photoelectric converting element 42 to the vertical transfer stage 43. The signal charges are then transferred, line by line in every horizontal scanning cycle, to the corresponding horizontal transfer electrode of the horizontal transfer stage 46, using the vertical transfer pulses $\phi$V1-$\phi$V4, thereby conducting the horizontal transfer. During the second field, the signal readout pulse $\phi$CH is applied to $\phi$V1 to transfer the signal charges generated at the photoelectric converting element 42 to the vertical transfer stage 43. The signal charges are then transferred at high speed, using a high-speed transfer pulse $\phi$VH attached to the vertical transfer pulses $\phi$V1-$\phi$V4, and are emitted from the horizontal transfer stage. After that, the signal readout pulse $\phi$CH is applied to $\phi$V3 to transfer the signal charges generated at the photoelectric converting element 42 to the vertical transfer stage. The signal charges are then transferred, line by line in every horizontal scanning cycle, to the corresponding horizontal transfer electrode of the horizontal transfer stage 46, using the vertical transfer pulses $\phi$V1-$\phi$V4, thereby conducting horizontal transfer. With the above operation, it is possible to obtain the video signal of field accumulation. As is apparent from FIG. 3a, the above-mentioned emission of unnecessary signal charge and transfer of the signal charges from the photoelectric converting section to the vertical transfer stage are performed during the vertical blanking period, thus preventing the light from the two optical paths from being mixed with each other for projection onto the photoelectric converting elements in the imaging device. Therefore, the television camera 40 shown in FIG. 1 alternately outputs the video signal of the object image transmitted through the optical path 1' for the first field, and the video signal of the object image transmitted through the optical path 2 for the second field, thus producing a three-dimensional image video signal.

In the IL-CCD, it is also possible to set the storage time of the signal charges in the photoelectric converting elements so as to be shorter than the field period. The purpose of a shorter storage time of the signal charges is to improve the dynamic resolution of the video signal. The imaging device produces the video signal by integrating (accumulating) the signal charges generated by the light signals projected onto the photoelectric converting element. Therefore, if the object moves during the integrating time of the signal charges, the resolution (referred to as the dynamic resolution) of the video signal will deteriorate. To improve the dynamic resolution, it is necessary to provide a shorter integrating (accumulating) time of the signal charges. The present invention is also applicable to the case where a shorter integrating (accumulating) time of the signal charges is used.

Figure 3B:
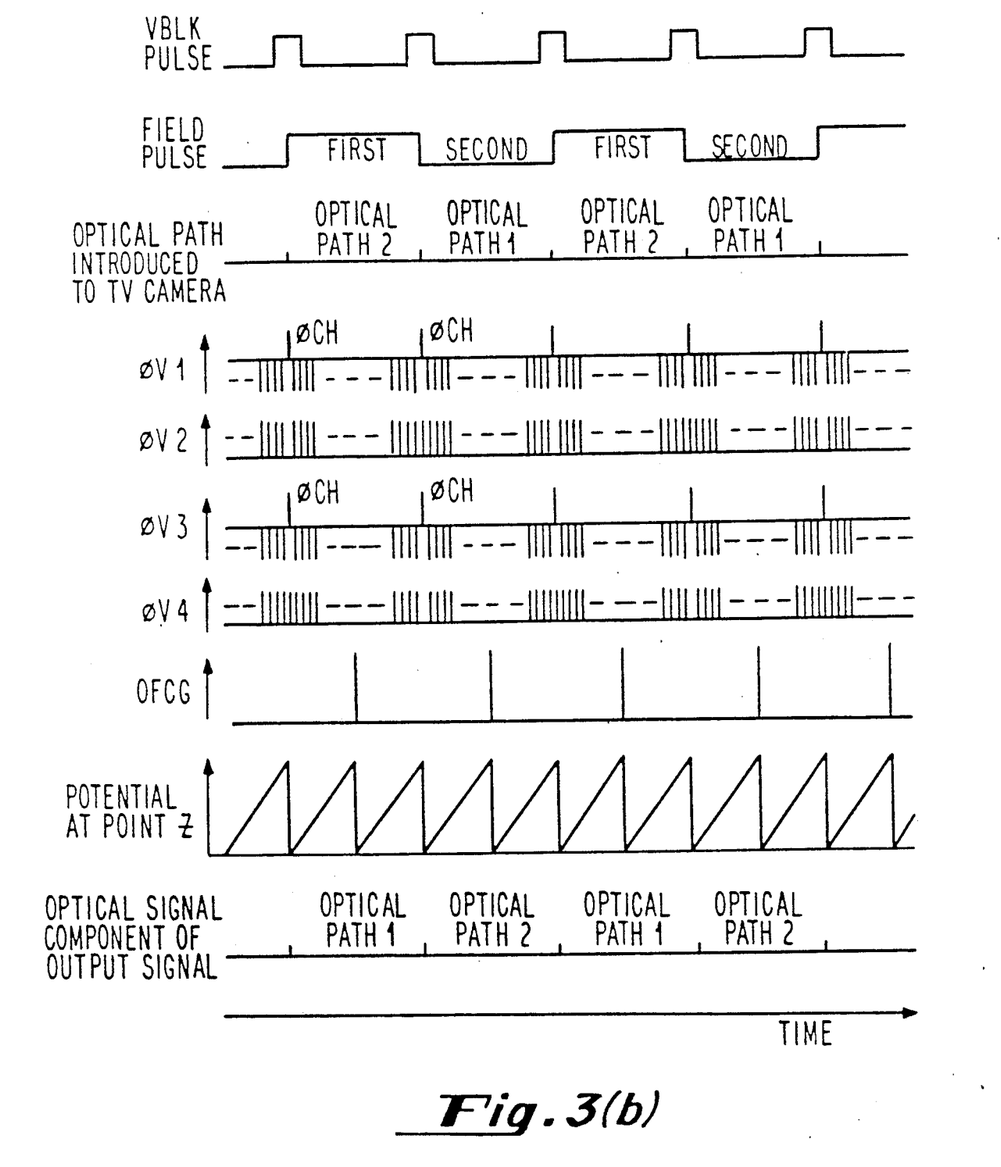

The following describes the principle with reference to FIGS. 2a and 3b. FIG. 3b shows the pulse (VBLK) representing the vertical blanking period, the field pulse emitted from the synchronizing signal generator 4 shown in FIG. 1, the signal readout timing of the IL-CCD, the driving timing of the liquid crystal shutters, the potential at the overflow control gate, the potential change in the photoelectric converting element at point Z, and the output signal from the imaging device.

An overflow drain (abbreviated as OFD) is provided, as is well know, to prevent the blooming phenomenon which is inherent in a solid-stage imaging device including the IL-CCD. The amount of charge which can be accumulated in the photoelectric converting element is set in terms of the potential of an overflow control gate (abbreviated as OFCG). When the signal charge is generated exceeding the set value, the excess charge spills from the OFCG into the OFG, thus draining the excess charge from the imaging device.

Therefore, when the potential barrier of the OFCG is lowered (i.e., the voltage applied to the OFCG is increased) while the light signals from the object are projected onto the photoelectric converting elements (i.e., during the vertical blanking period), the signal charges accumulated in the photoelectric converting elements are spilled into the OFD. As a result, the potential of the photoelectric converting element at point Z is as shown in FIG. 3b. The above operation makes it possible to obtain a video signal with the storage time shorter than the field period. Thus, the light from the two optical paths is prevented from being mixed with each other and being projected onto the photoelectric converting elements in the imaging device. Therefore, the television camera 40 shown in FIG. 1 alternately outputs the video signal of the object image transmitted through the optical path 1 for the first field, and the video signal of the object image transmitted through the optical path 2 for the second field, thus producing a three-dimensional image video signal.

In this embodiment, description has been giving dealing with the case of a horizontal OFD with and OFCG and an OFG which are disposed adjacent to each photoelectric converting element, but the present invention is also applicable to the case in which a vertical OFD disposed in the internal direction of the imaging device is used. The operating principle described with reference to FIG. 3b can be directly applied to the case in which the storage time is controlled by using an frame-/interline transfer solid-state imaging device. Since the frame/interline transfer solid-state imaging device is described in detail in Japanese Unexamined Patent Publication (Kokai) No. 55(1980)-52675, a description of this device will not be given. This imaging device is essentially the same device as the above-mentioned interline transfer solid-state imaging device except that a vertical transfer storage gate is disposed on the extension of each of the vertical transfer stages. The purpose of this construction is to reduce the level of vertically generated smears by sequentially reading out the signal charges in the light receiving section after transferring them at high speed to the vertical storage transfer stage, as well as to enable the exposure time of the photoelectric element to be set at any value. Setting the exposure time of the photoelectric converting element at any value has the same effect as described in FIG. 3b in terms of an example of control of the exposure time (storage time) using the interline solid-state imaging device. Referring again to FIG. 3b, the optical paths are alternately selected to project light into the television camera, approximately in synchronization with the timing of reading out the signal charges from the photoelectric converting elements to the vertical transfer stages. Alternatively, as is apparent from FIG. 3b, the optical paths may be alternately selected using the liquid crystal shutters, approximately in synchronization, for example, with the timing at which the pulse voltage is input to be applied to the OFCG. Also, an object image through each optical projected onto the photoelectric converting elements may be approximately equal to the period from the timing of application of the pulse voltage to the OFCG to the timing of application of the readout pulse. It is also apparent that in the case where a storage period of the signal charges in the photoelectric converting elements is shorter than the field period, the projection periods from the two optical paths into the television camera are not necessary to be equal. In other words, the object image through each optical path projected onto the photoelectric converting elements of the solid-stage imaging device should be approximately equal to or cover the signal storage time.

As described above, according to the present invention, object images introduced through two different optical paths are alternately selected in synchronization with the field scanning of the imaging device, thus permitting the use of a single television camera for picking up an image in three dimensions. In this embodiment, the timings shown in FIGS. 2 and 3 are used, but the signal charge readout timing and the switching timing of the liquid crystal shutters have only to be set inside the vertical retrace period. Also, the relative division of the signal charge readout timing with respect to the switching timing of the liquid crystal shutters is allowable for practical use if the deviation is inside the vertical retrace period. In this embodiment, description of the three-dimensional image pickup apparatus has been omitted as it is exactly the same as the one described with reference to FIG. 4.

Industrial Applicability

As described above, the present invention can provide a three-dimensional image pickup apparatus using a single television camera which is inexpensive. Furthermore, since the use of only one television camera for picking up an image in three dimensions eliminates the need for precise adjustment of the angle of the television camera to the object and other settings, it is quite easy to adjust the shooting angle and focusing. Therefore, the three-dimensional image pickup apparatus of the present invention does not only allow anyone who does not have a special skill to shoot an object to produce an image in three dimensions, but also provide improved mobility of the apparatus.

We claim:

1. A three-dimensional image pickup apparatus having a television camera provided with an imaging device which comprises at least photoelectric converting elements and vertical transfer stages corresponding to said photoelectric converting elements, said imaging device reading out signal charges stored in said photoelectric converting elements one or more times in one field by transferring the signal charges simultaneously to said vertical transfer stages, wherein object images transmitted through two optical paths are alternately selected for every field to be picked up, substantially synchronous with the transfer timing of transferring the signal charges from said photoelectric converting elements to said vertical transfer stages.

2. A three-dimensional image pickup apparatus according to claim 1, wherein, when the object images through two optical paths are alternately selected for every field to be picked up, the storage period of the signal charges in said photoelectric converting elements is equal to or shorter than the period of projecting the selected object image onto the photoelectric converting elements, and the storage period of the signal charges in the photoelectric converting elements is inside the period of projecting the selected object image onto the photoelectric converting elements.

3. A three-dimensional image pickup apparatus according to claim 1, wherein, in the case where the photoelectric converting elements functions also as the vertical transfer stages, the imaging device comprises a storage site for the signal charges on the extension of each vertical transfer stage in its transferring direction.

4. A three-dimensional image pickup apparatus according to claim 1, wherein the imaging device transfers the signal charges stored in the photoelectric converting elements to the vertical transfer stags, mixes the signal charges from two vertically adjacent photoelectric converting elements with each other, and then performs the vertical and horizontal transfer to produce an output.

5. A three-dimensional image pickup apparatus according to claim 1, wherein the imaging device picks up an image in the manner that, among the signal charges accumulated in the photoelectric converting elements by projecting an object image, the signal charges which have been obtained by the photoelectric conversion before a predetermined period are previously eliminated by the photoelectric converting elements and the vertical transfer stages, thereby equivalently restricting the projection of the object image onto the photoelectric converting elements, to or within one field period.

6. A three-dimensional image pickup apparatus according to claim 1, wherein each optical path comprises a plurality of mirrors and a shutter for blocking light, and alternately selects the object images obtained through said optical paths using said shutter in synchronism with the field scanning operation of the television camera.

* * * * *